United States Patent [19]

Schmitt

[11] Patent Number: 4,844,255
[45] Date of Patent: Jul. 4, 1989

[54] COOLING WATER PUMP SEAL

[75] Inventor: Wolfgang Schmitt, Viernheim, Fed. Rep. of Germany

[73] Assignee: Firma Carl Freudenberg, Weinheim/Bergstrasse, Fed. Rep. of Germany

[21] Appl. No.: 40,378

[22] Filed: Apr. 20, 1987

[30] Foreign Application Priority Data

Jun. 7, 1986 [DE] Fed. Rep. of Germany ....... 3619309

[51] Int. Cl.⁴ ............................................. F16J 15/32
[52] U.S. Cl. ....................................... 277/23; 277/53; 277/152
[58] Field of Search ................... 277/23, 24, 134, 152, 277/153.53, DIG. 4

[56] References Cited

U.S. PATENT DOCUMENTS

| | | | |
|---|---|---|---|
| 2,334,396 | 11/1943 | Dorward | 277/23 |
| 2,878,048 | 3/1979 | Peterson | 277/53 X |
| 3,384,382 | 5/1968 | Rink | 277/152 X |
| 3,549,154 | 12/1970 | Jones | 277/24 |
| 4,155,605 | 5/1979 | Repella | 277/134 X |
| 4,427,201 | 1/1984 | Belsanti | 277/152 X |
| 4,493,490 | 1/1985 | Ohma | 277/152 X |

FOREIGN PATENT DOCUMENTS 2750462  5/1979  Fed. Rep. of Germany ...... 277/153
56-150668 11/1981  Japan ................................... 277/152

Primary Examiner—Robert S. Ward
Attorney, Agent, or Firm—Kenyon & Kenyon

[57] ABSTRACT

A cooling water pump seal for a combustion engine, in which a main seal rests on a shaft with a sliding fit and is preceded on the cooling water side by a protective seal. The protective seal consists of a filter fleece and is fastened to the housing supporting the main seal.

11 Claims, 1 Drawing Sheet

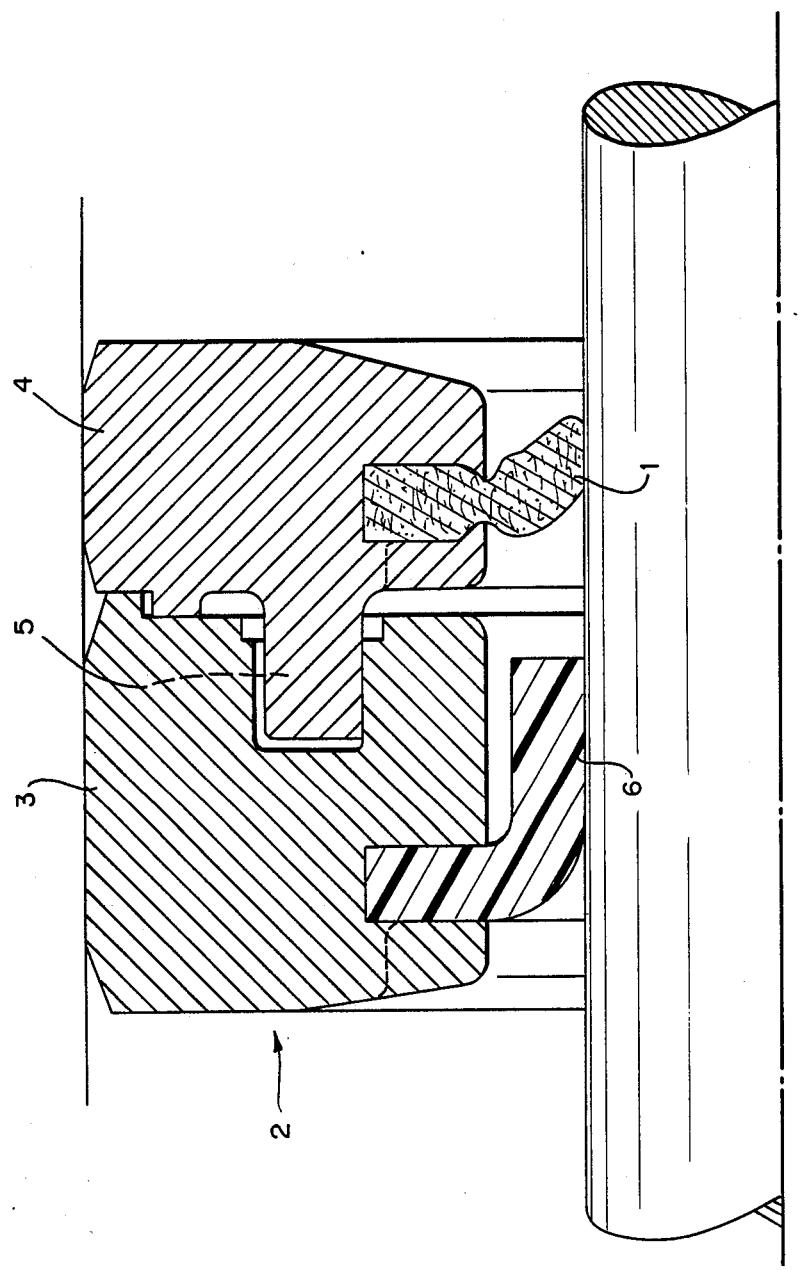

COOLING WATER PUMP SEAL

BACKGROUND OF THE INVENTION

1. Field of the Invention

This invention relates generally to a cooling water pump seal for a combustion engine. More particularly, this invention relates to a cooling water pump seal having a main seal that rests on a shaft with a sliding fit and a protective seal fastened to the housing that supports the main seal.

2. The Prior Art

A cooling water pump seal in which a protective rubber seal forms an integral part of a rubber main seal is disclosed in U.S. Pat. No. 4,155,560. This and other prior art cooling water pump seals, however, suffer from disadvantageously short service lives. This problem encountered in employing prior art cooling water pump seals in a combustion engine is attributable in part to the stress imposed upon the main seal by the protective seal. A further problem encountered in using prior art cooling water pump seals in combustion engines is thermal loading of the seal during use. This thermal loading problem is particularly acute in the dynamic sealing zone of prior art seals. Abrasive particles present in coolants, such as rust particles or sand, also contribute to the unsatisfactory service life of cooling water pump seals disclosed in the prior art.

SUMMARY AND OBJECTS OF THE INVENTION

It is therefore an object of the present invention to provide a cooling water pump seal for a combustion engine which is characterized by improved service life.

It is a further object of the present invention to provide a cooling water pump seal that has an improved service life and which is adaptable for use in a combustion engine.

It is a still further object of the present invention to provide a cooling water pump seal with a decreased thermal loading.

These and other objectives of the present invention will be in part obvious and in part paritcularly pointed out.

In accordance with the present invention, a cooling water pump seal adaptable for use in combustion engines is provided in which a main seal rests on a shaft with a sliding fit and is preceded on the cooling water side by a protective seal, the protective seal comprised of a filter fleece fastened to a housing that supports the main seal.

In the cooling water pump seal of the present invention, the main seal is no longer stressed by the protective seal, and therefore realizes a substantially improved following of the radial movement of the sealed shaft. Further, the substantially reduced pressure exerted by the protective seal against the surface of the sealed shaft of the present invention contributes to improved sealing. Additional advantages realized by the cooling water pump seal of the present invention include a decrease in operational wear as well as a decrease in thermal stress in the region of the dynamic sealing zone.

By the insertion of a filter fleece between the dynamic sealing zone of the main seal and the circulating cooling water of the combustion engine, continuous contact of the dynamic sealing zone by fresh cooling water free of suspended material is assured. The heat removal from the region of the dynamic sealing zone is thereby improved while the detrimental effect of abrasive particles such as rust or sand on the dynamic sealing zone is greatly reduced. The improvement in the length of the service life of a cooling water pump seal according to the present invention is substantially attributable to this decrease in abrasion.

The filter fleece employed in the seal of the present invention can have a thickness of 0.6 to 4.0 mm, and an area weight of 60 to 900 g/m$^2$, depending on the thickness of the shaft to be sealed. The thickness of the filter fleece increases within the aforementioned range as the area weight increases. In a preferred embodiment of the present invention the thickness of the filter fleece ranges from 1.0 to 1.8 mm and has an area weight of 100 to 300 g/m$^2$. In this preferred embodiment, the filter fleece is comprised of polyester fibers.

The circular shape of the protective seal of the present invention enables it to be held in a support ring which is secured to the housing by a plug connection. The support ring is preferably comprised of plastic and can be connected to the protective seal in a particularly simple and precise manner by direct spraying. The plastic of the support ring is in a liquid state during formation of the ring and penetrates into the pore structure of the filter fleece, thereby assuring particularly firm bonding of each individual fiber. Undersirable fiber separation is thereby prevented.

BRIEF DESCRIPTION OF THE DRAWINGS

The FIGURE is a cross-sectional illustration of a cooling water pump seal in accordance with the present invention.

DETAILED DESCRIPTION OF A PREFERRED EMBODIMENT

Referring to the FIGURE, a cooling water pump seal in accordance with the present invention is illustrated in which main seal 6 is mounted in housing 3. Main seal 6 rests on the surface of shaft 7 with a sliding fit. Housing 3 is preferably comprised of plastic.

The protective seal 1 consists of a circular cut of fleece material which has a thickness of approximately 1.3 mm with an area weight of approximately 220 g/m$^2$ and can consist entirely of polyester fibers welded to each other. The circular ring cut of the protective seal 1 is further held on the outside in a plastic support ring 4 which in turn is secured by a frictional and/or form locking connection to housing 3 of the main seal. The plug connection between the support ring 4 and the housing 3 of the main seal consists of axially extending posts 5 of the support ring 4 uniformly distributed over the circumference of support ring 4 which engage corresponding recesses in housing 3 with a pressure sufficient to tolerate the stress imposed upon the support ring 4 and housing 3. The plug connection between support ring 4 and housing 3 can be enhanced by adhesive bonding.

The connection between support ring 4 and protective seal 1 is achieved by the formation of support ring 4 around protective seal 1. In the preferred embodiment, support ring 4 consists of plastic which is initially deposited around protective seal 1 as liquid, and which solidifies around the protective seal 1. As the liquid plastic of support ring 4 solidifies, it penetrates the pore structure of protective seal 1. This penetration of the plastic material of support ring 4 into the pore structure of protective seal 1 ensures both the secure bonding of the support ring 4 and protective seal 1 and enhances the bonding between the individual fibers of protective seal 1. A cooling water pump seal manufactured in accordance with the present invention can be installed as a complete unit into a combustion engine.

It is to be understood that the invention is not limited to the illustrations described and shown herein, which are deemed to be merely illustrative of the best modes of carrying out the invention. The invention also encompasses all such modifications which are within the scope of the following claims.

What is claimed is:

1. A seal assembly for a cooling water pump in an internal combustion engine, comprising:
   a rotatable shaft having a cylindrical outer surface;
   an annular main seal slidingly engaging said surface;
   a housing supporting said main seal;
   an annular protective seal comprising a filter fleece; and
   a support ring which holds the protective seal and which is secured to the housing by a plug connection on a side thereof facing cooling water in the pump.

2. A seal assembly for a cooling water pump in an internal combustion engine, comprising:
   a rotatable shaft having a cylindrical outer surface;
   an annular main seal slidingly engaging said surface;
   a housing supporting said main seal;
   an annular protective seal comprising a filter fleece, the fleece having an area weight of 60 to 900 g/m$^2$ and a thickness of 0.6 to 4.0 mm; and
   a support ring which holds the protective seal and which is secured to the housing by a plug connection on a side thereof facing cooling water in the pump.

3. A seal assembly for a cooling water pump in an internal combustion engine, comprising:
   a rotatable shaft having a cylindrical outer surface;
   an annular main seal slidingly engaging said surface;
   a housing supporting said main seal;
   an annular protective seal comprising a filter fleece consisting of polyester fibers; and
   a support ring which holds the protective seal and which is secured to the housing by a plug connection on a side thereof facing cooling water in the pump.

4. A seal assembly for a cooling water pump in an internal combustion engine, comprising:
   a rotatable shaft having a cylindrical outer surface;
   an annular main seal slidingly engaging said surface;
   a housing supporting said main seal;
   an annular protective seal comprising a filter fleece, the fleece having an area weight of 60 to 900 g/m$^2$ and a thickness of 0.6 to 4.0 mm and consisting of polyester fibers; and
   a support ring which holds the protective seal and which is secured to the housing by a plug connection on a side thereof facing cooling water in the pump.

5. The cooling water pump seal of claim 1 in which the support ring consists of plastic.

6. The cooling water pump seal of claim 2 in which the support ring consists of plastic.

7. The cooling water pump seal of claim 3 in which the support ring consists of plastic.

8. The cooling water pump seal of claim 4 in which the support ring consists of plastic.

9. The seal assembly defined in claim 1 wherein said filter fleece includes a multiplicity of fibers of synthetic resin material, the support ring being further comprised of a synthetic resin material welded to said protective seal by casting said support ring around said protective seal, said fibers being embedded in said support ring.

10. A seal assembly for a cooling water pump in an internal combustion engine, said pump having a rotatable shaft with a cylindrical outer surface, said seal assembly comprising:
    a housing;
    an annular main seal supported by said housing and slidingly engageable with said surface;
    a support ring substantially coaxial with said main seal and fastened to said housing laterally thereof by a plug connection; and
    an annular protective seal comprising a filter fleece, said protective seal being melded to said support ring and slidingly engageable with said surface.

11. A method for forming a seal assembly for a cooling water pump in an internal combustion engine, comprising the steps of:
    providing (a) a rotatable shaft having a cylindrical outer surface and (b) an annular main seal supported by a housing;
    disposing said annular main seal and said housing with respect to said shaft so that said main seal slidingly engages said surface;
    providing a filter fleece including a multiplicity of synthetic resin fibers arranged in an annular array;
    casting a synthetic resin support ring around said fleece so that said fibers are embedded in said ring; and
    fastening said ring to said housing by a plug connection on a side thereof facing cooling water in the pump so that said fleece slidingly engages said surface.

* * * * *